United States Patent [19]

Lindblad

[11] 4,148,447

[45] Apr. 10, 1979

[54] LOCKING DEVICE FOR SAFETY BELTS

[76] Inventor: Stig M. Lindblad, 20 rue Saint-Pierre, CH-1701 Fribourg, Switzerland

[21] Appl. No.: 841,927

[22] Filed: Oct. 13, 1977

[30] Foreign Application Priority Data

Oct. 14, 1976 [SE] Sweden .............................. 7611398

[51] Int. Cl.$^2$ ...................... A62B 35/02; B65H 75/48
[52] U.S. Cl. .............................................. 242/107.4 A
[58] Field of Search ............................... 242/107.4 A; 280/744–747; 297/388

[56] References Cited

U.S. PATENT DOCUMENTS

| 3,868,068 | 2/1975  | Heath         | 242/107.4 A |
| 3,930,622 | 1/1976  | Tanaka et al. | 242/107.4 A |
| 3,944,164 | 3/1976  | Tibbe         | 242/107.4 A |
| 3,967,510 | 7/1976  | Lindblad      | 242/107.4 A |
| 4,053,117 | 10/1977 | Takada        | 242/107.4 A |

*Primary Examiner*—Harvey C. Hornsby
*Assistant Examiner*—John M. Jillions

[57] ABSTRACT

Locking device for safety belts of the reel-belt type preferably intended for vehicles and provided with a band, which against the bias of a spring can be unwound from a rotating bandreel. The device comprises a ratchet wheel which normally rotates with the reel and a pawl mechanism with a pawl for cooperation with the ratchet wheel. The pawl can be switched between a position, in which it releases the ratchet wheel, and a locking position, in which it engages the ratchet wheel in order to impede its rotation in one direction. The device further comprises an activating means, which is arranged to occupy an activated condition and to be in an inactive condition and depending upon its condition to actuate the pawl mechanism for shifting of the pawl between its releasing and its locking positions. The activating means comprises a body of inertia, which is adapted under the influence of forces of inertia to be shifted from a rest position to an activated position, and a transmission element, which is designed to sense the position of the body of inertia and in dependence thereof to actuate the pawl. The transmission element and the body of inertia are supported by separate supports. The transmission element is in cooperation with the body of inertia shiftable between an activated position and a rest position under the influence of return forces.

7 Claims, 11 Drawing Figures

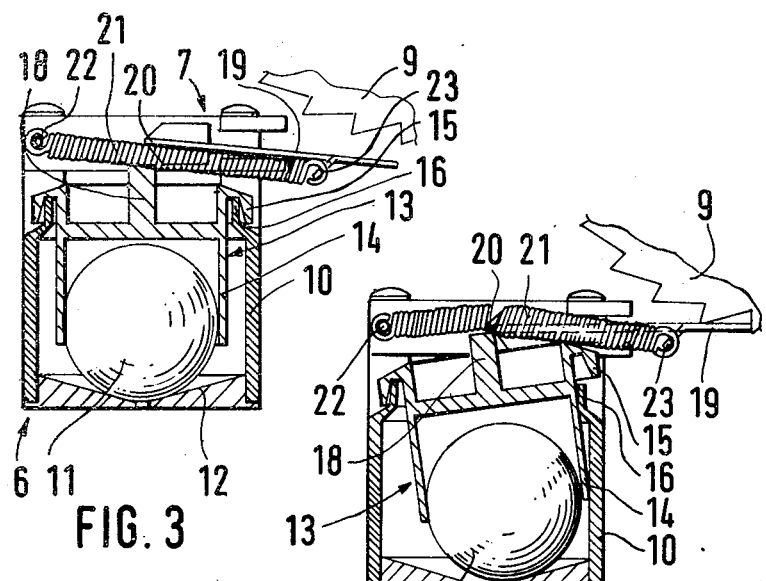
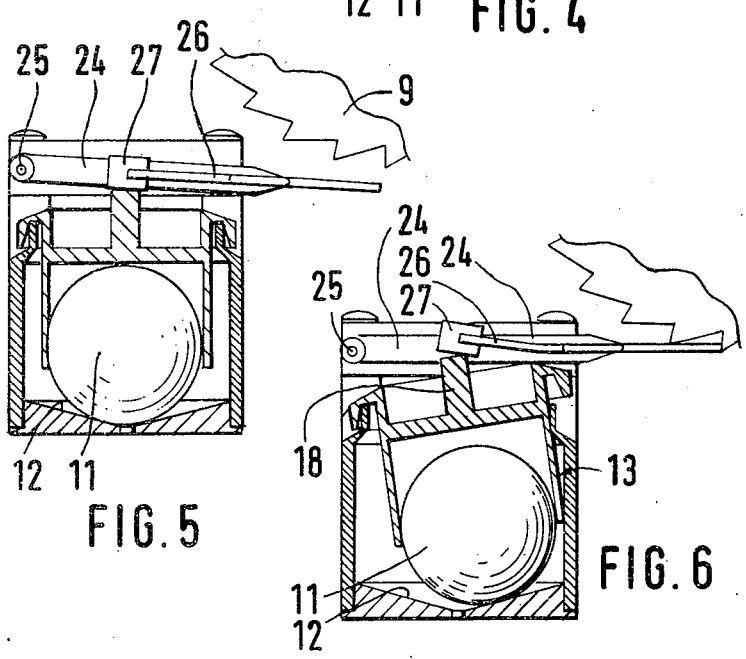

LOCKING DEVICE FOR SAFETY BELTS

The present invention relates to a locking device for safety belts of the reel-belt type, preferably intended for vehicles and provided with a band, which against the bias of a spring can be unwound from a rotatable bandreel. The locking device comprises a ratchet wheel or the like normally rotatable with the reel and a pawl mechanism with a pawl for cooperation with the ratchet wheel, which pawl can be switched between a position, in which it releases the ratchet wheel, and a locking position, in which it engages the ratchet wheel in order to impede its rotation in one direction. There is provided an activating means, which is arranged to be in an activated condition and to be in an inactive condition and depending upon its condition to actuate the pawl mechanism to shift the pawl between its releasing and its locking position. The activating means substantially comprises a body of inertia, which is adapted under the influence of forces of inertia to be shifted from a rest position to an activated position, and a transmission element, which is designed to sense the position of the body of inertia and in dependence thereof to actuate the pawl.

The locking device according to the invention is adapted in dependence on an activating means actuated by forces of inertia to lock a band reel against unwinding of a band of a safety belt wound up on the same and to release the reel for unwinding of said band respectively. Strict requirements with respect to the function of such activation means are made as regards reliability, sensitivity, speed, etc., and it is a desired object to be able to produce an activating means, which as far as possible can be dimensioned to yield an optimum result.

It is therefore an object of the present invention to provide a locking device, in which the activating means can be designed in such a manner that the activating forces operating on the activating means and the locking mechanism can be chosen irrespective of the forces of retrogression, which tend to change over the activating means to an inactivated condition. Thus, with such an arrangement one can provide the locking device with optimum qualities in order to comply with very great demands upon the function of the device.

Said object is reached by means of a locking device, which is characterized by the transmission element and the body of inertia being designed to be supported by separate supports and by the transmission element being designed in cooperation with the body of inertia to be shifted between an activated position and a rest position under the influence of return forces.

The invention will now be described more in detail in the form of several embodiments, reference being made to the accompanying drawings, in which:

FIGS. 3 and 4 illustrate a locking device according to a first embodiment of the invention in inactivated condition and in activated condition;

FIGS. 5 and 6 show a second embodiment of the locking device according to the invention in corresponding positions;

Figure 1:
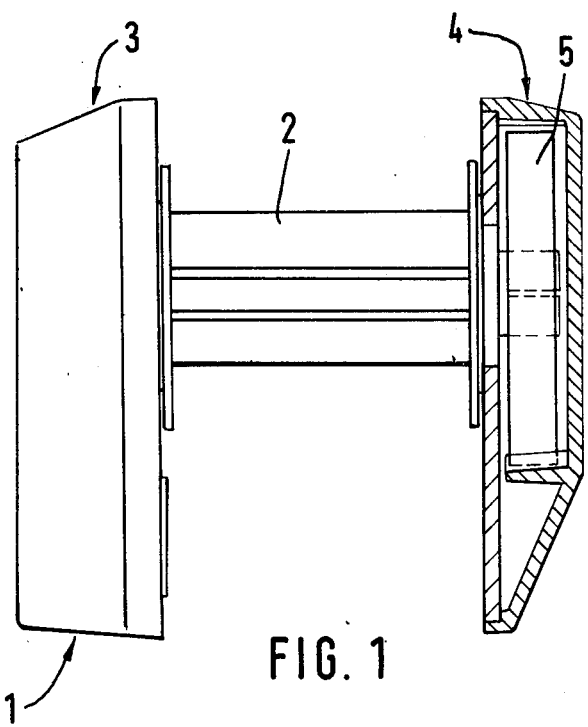
FIGS. 1 and 2 are cross-sectional views through a reel device forming part of a reel-type safety belt, in connection with which the invention can be applied to advantage.
Figure 2:
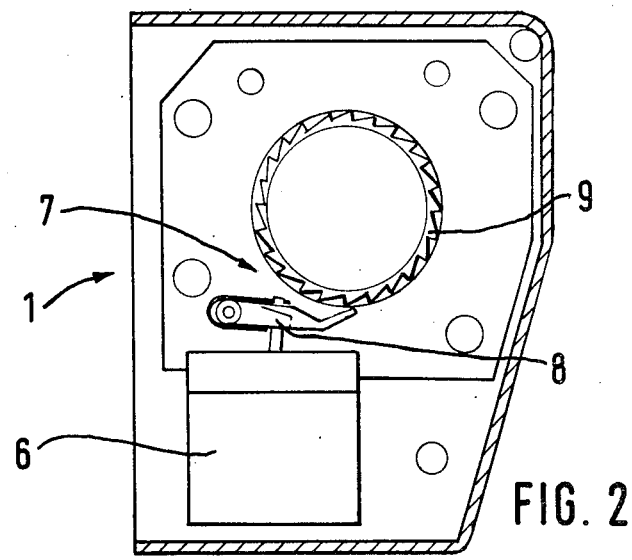

A winding-up device of a common type, in which the locking device according to the invention can find an application to advantage, is schematically illustrated in the FIGS. 1 and 2. According to these figures the winding-up device 1 substantially comprises a band-reel 2, to which one end of the band (not shown) of the safety belt is fastened. The band-reel is pivoted at two side portions 3, 4 and is intended to wind up and unwind respectively the band of the safety belt, while being subjected to the actuation of a winding-up spring 5 incorporated into one side portion 4. A locking device, quite schematically illustrated, is incorporated into the other side portion 3, said locking device substantially comprising an activating means 6 and a pawl mechanism 7, which can be actuated by this activating means. Said mechanism is arranged under certain conditions to lock the band-reel against unwinding of the band of the safety belt. The activating means according to the invention is an automatically functioning mechanism, which can be actuated by forces of inertia, and several different examples of this mechanism are shown in the other figures. Also the pawl mechanism 7 is quite schematically shown in FIG. 2, and in principle it comprises a pawl 8 and a ratchet wheel 9. The pawl is adapted to cooperate with the ratchet wheel 9 in order to lock this wheel against rotation in one direction and alternatively to release the same, whereby the band-reel 2 is locked against rotation in one direction and released respectively.

For clarity's sake the mechanism mentioned above is very schematically illustrated in FIG. 2, and in principle it can be of a simple design, in which the ratchet wheel 9 is rigidly connected with the band-reel 2. However, in connection with such a design the pawl 8 must take up the load acting upon the band of the safety belt, and in practice the pawl mechanism 7 is therefore designed in such a manner that the illustrated mechanism is arranged to initiate a second mechanism, which unloads the pawl 8, and which is intended to take up the stresses on the band of the safety belt. By way of example such a mechanism can be made in such a manner that it is initiated also by the forces of acceleration appearing in connection with rapid unwinding of the band of the safety belt. However, for clarity's sake a more detailed description of such a mechanism has been omitted in the present application, as it is not necessary for the understanding of the function and the principle design of the present invention.

In the FIGS. 3 and 4 a first embodiment of the activating means 6 and the pawl mechanism 7 is illustrated. According to this embodiment the activating means comprises a body of inertia 11 in the shape of a ball, which is movable inside a housing 10, said body of inertia being arranged in inactivated condition (see FIG. 3) to rest on the bottom of a conical support 12. A first transmission element 13 also forms part of the activating means 6, and according to an advantageous embodiment comprises a tube 14, which in its top portion is provided with a flange 15, by means of which the tube is suspended in the housing 10 resting upon an annular support 16. The tube 14 has such a location that in all directions it can cooperate with the mantle surface of the ball 11. An activating element 18 further forms part of the activating means and has the design of an upright pin or the like.

The pawl mechanism 7 according to the example illustrated in the FIGS. 3 and 4 is provided with a pawl 19, which is pivotable between a position, in which it locks the ratchet wheel 9, and a position, in which it releases the same, round a bearing point 20, which in the example shown is designed as two concave dolly surfaces shaped in a portion of the housing 10. In the illustrated example the pawl 19 in fact has an advantageous forked design with two fork legs, the free ends of which rest against the dolly surfaces mentioned above. The pawl 19 is kept in place by means of a retaining spring 21, which in the example shown is designed as a tension spring stretched between a fixed point 22 in the housing 10 and a point 23 of attachment on the pawl 19, which points are each placed on a respective side of the bearing point 20 for the pawl and in such a manner that the retaining spring 21 substantially extends in the longitudinal direction of the pawl. In connection with said forked design of the pawl the retaining spring 21 extends in the space formed between the two legs of the fork. The activating element 18 abuts against a portion of the retaining spring 21.

In the embodiment of the pawl mechanism illustrated in the FIGS. 5 and 6 the pawl 24 is pivoted round an axis 25 and provided with a second transmission element, namely a spring element 26, which comprises a tongue projecting from the pawl, which tongue at its free end is provided with a sensing element 27. According to this example the spring element 26 can be made of the same material as the pawl 24, by way of example plastic as polyacetal or the like, the spring element being dimensioned in such a manner that the desired springing qualities are obtained.

Figures 7, 8:
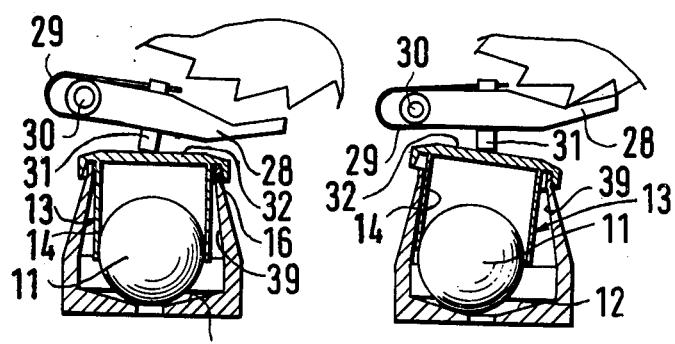
FIGS. 7, 8 and 9 illustrate a third embodiment of the locking device according to the invention in different positions.
Figure 9:
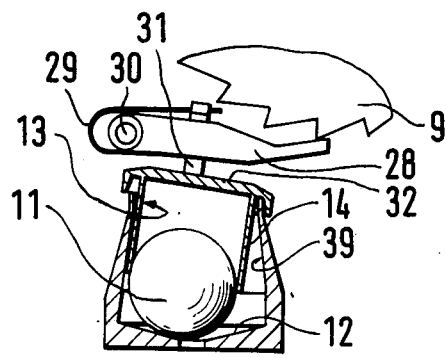

According to the embodiment of the pawl mechanism illustrated in the FIGS. 7, 8 and 9 the pawl 28 is provided with a springing element 29 in the form of a wire spring or a plate spring, which is designed in a resilient manner to embrace the pawl 28 from two sides, in which connection it is bent round the bearing point 30 of the pawl. One end of the springing element 29 is provided with a sensing element 31, which extends across the pawl and is arranged to sense the activated or nonactivated condition of the activating means. As is evident from these figures, the design of the element 13 of transmission somewhat deviates from the example shown in the FIGS. 3-6, its top side having a substantially plane portion 32, against which the sensing element 31 of the pawl mechanism rests. This example still further deviates from the previously described one by the housing 10 exhibiting an inside wall 39, which is designed in such a manner that the space thereby enclosed conically tapers towards the annular support 16 for the transmission element 13. The inclination of the inside wall thereby obtained is adapted in such a way that the tube 14 in activated condition is brought to bear against the inside wall along its whole height, as is evident from FIG. 8.

Figures 10, 11:
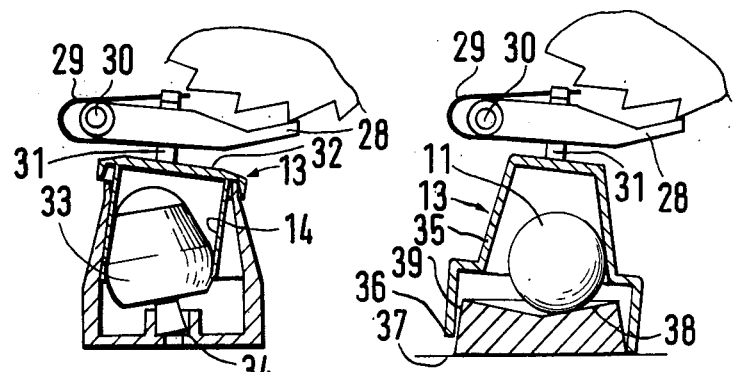
FIG. 10 shows a fourth embodiment of the locking device.
FIG. 11 shows the locking device in a fifth embodiment.

In the example of FIG. 10 the body of inertia comprises an upright pendulum 33, which from a non-activated condition standing upright on a support 34 can be tilted into the position illustrated in FIG. 10 against the inside of the tube 14 of the transmission element 13.

FIG. 11 shows a variant of the first transmission element 13, which substantially comprises a tube 35, which with an annular bottom edge portion 36 stands on a fairly plane support 37. The body of inertia 11, which in this case comprises a ball, rests on a cup shaped concave support 38, which in this example is somewhat raised relative to the support 37 for the transmission element 35. The raised support 38 is provided with an edge portion 39, which has an angle of inclination suitably adapted to permit a tilting of the element of transmission to the activated condition illustrated in the figure from a non-activated condition with the bottom edge portion 36 of the tube 35 completely at rest against its support 37.

The activating means is normally in the non-active condition, and the pawl occupies the releasing position. In the FIGS. 2, 3, 5, 7 and 11 the releasing position of the different embodiments of the locking device is shown. The pawl in this position is pivoted downwards by the influence of its own weight according to the FIGS. 2, 5 and 7, or possibly subjected to the bias of a feeble spring force. In the embodiment according to FIGS. 3 and 4 the retaining spring 21 exercises a spring force, which tends to maintain the pawl 19 in the releasing position or alternatively in the locking position according to the line of application of the spring force, which line can be shifted by means of the activating device via the activating element 18.

Under certain conditions the activating means is in the activating condition, which in connection with the types of activating means shown takes place at a certain change of speed of the vehicle or when it is parked on a foundation having a certain degree of inclination. Such a situation is illustrated in FIG. 4, where the body 11 of inertia has displaced itself on its support 12, whereby the transmission element 13 arranged to sense the movement of the body of inertia is tilted in relation to its support 16 by the fact that the tube 14 is carried along in the movement of the ball. The activating element 18 is hereby raised against the retaining spring 21, which is bent to such an extent that the line of application of the spring force is shifted past the bearing point 20 of the pawl 19, which results in that the pawl tends to switch to the locking position, in which the pawl engages the toothing of the ratchet wheel 9.

In the embodiment shown in FIG. 6 the raising of the activating element 18 has resulted in that the pawl 24 via the spring element 26 has been urged towards a locking position in which connection the spring element as mentioned above does not exercise any springing force, worth mentioning, if the pawl without obstruction can be brought into said engaging position.

As mentioned above, an activated condition in connection with the embodiment illustrated in the FIGS. 7, 8 and 9 involves that the transmission element 13 has tilted over, so that the tube 14 along its whole height will abut against the inside wall 39 of the housing 10. This brings about a relief of the forces of the body 11 of inertia acting upon the transmission element 13 and a very distinct end position in the activated condition.

As is evident from FIG. 10, an activated condition of the activating means according to this example involves that the pendulum 33 has tilted against the inside of the tube 14, whereby the sensing element 31 slides along the supporting surface 32 at the same time as it is pressed upwards. By means of the spring element 29 the pawl 28 tends to occupy its locking position. Thus, any spring action worth mentioning does not take place in the spring element 29, if the pawl 28 without obstruction can be brought into a locking engagement with the toothing 47 of the ratchet wheel 9.

In the embodiment illustrated in FIG. 11 the first transmission element 13 tilts over from its rest position with the whole annular bottom edge portion 36 resting against the support 37 to the condition illustrated in the figure under the influence of the body 11 of inertia, which actuated by forces of inertia is caused to leave its rest position at the bottom of the cup shaped support, whereby the pawl mechanism is actuated in a manner corresponding to what has been described in connection with the preceding examples.

As evident from the FIGS. 4, 6, 9 and 11, all of the pawl mechanisms shown are provided with a second spring transmission element between the activating means and the pawl forming part of the pawl mechanism. The spring transmission element in this connection is adjusted in such a manner that it is substantially operative, when the pawl is free to be brought into engagement with the toothing of the ratchet wheel in order to bring about a locking action, but that it springingly yields in such a way that the spring element takes up the pivoting movement of the pawl, when the ratchet is rotated against the locking direction, i.e. when the band of the safety belt is wound up on the winding-up reel in those cases, when the activating means is in activating condition. The pivoting movements of the pawl will thereby not be transmitted to the activating means, which thus is relieved from unnecessary stresses, which involve wear and risk of damage to the mechanism due to the influences of forces, which otherwise arise between the forces of inertia and the actuation of the pawl upon the activating means.

When said activating condition of the vehicle ceases, the body 11, 33 of inertia and of course also the first transmission element 13 are no longer influenced by any laterally directed forces but exclusively by the force of gravity. This tends to influence the first transmission element 13 in such a manner that it again occupies the normal position on its support 16. Also the body 11, 33 of inertia is returned to its normal position, in which it does not activate the pawl mechanism. During the return movement to the normal position the body of inertia not only is influenced by the first transmission element 13, when it tends to occupy its normal position on the support, but also directly by the force of inertia because of the fact that the body of inertia 11, shaped as a ball, tends to occupy the lowest point, i.e. the mid point of its support 12, 38, and the pendulum shaped body 33 of inertia tends to occupy an upright position on its support 34 respectively. Thus, in connection with a power actuation by the activating means the following cases can arise:

1. The influence of the force of gravity, when the activating means is in normal position and is not subjected to any great forces of acceleration, tends to keep the first transmission element in the normal position on its support;

2. Laterally directed forces such as forces of acceleration or the force of gravity, when the activating means has a greater inclination relative to the normal position, tend to bring the body of inertia out of its normal position, in which connection it tends to influence the first transmission element to activate the pawl device;

3. Lateral forces, which tend to bring the first transmission element out of its normal position, thus towards an activating position. This influence comes into existence, if the center of gravity of said transmission element is outside of the support;

4. Forces of gravity against the body of inertia, which tend to move it to the normal position. Such forces arise, if the body of inertia is provided with such a support that its normal position is of a stable nature.

The influences of forces according to 1 and 2 can be called "the return function" and "the activating function" and are themselves the very foundation of the function of the activating device. The function according to 3 and 4, however, are secondary or auxiliary functions and the device can be designed with or without these functions. If secondary functions are present, they can be utilized in order to reinforce the principal functions according to 1 and 2, and if on the other hand the device is designed without any secondary functions, the characteristic function of the device, viz. the appearance of the return function by means of the transmission element and the appearance of the activating function by means of the body of inertia, will appear in pure form. This takes place, if the center of gravity of the first transmission element is in line with its support, and if the body of inertia within its range of movement occupies a quite indifferent position, by way of example because of its support being plane. One can even go so far that one gives the body of inertia an unstable normal position, to which the body of inertia must be actively returned by the first transmission element, which is subjected to corresponding forces of return.

In the embodiments shown the first transmission element for simplicity's sake has been designed in such a manner that its center of gravity is somewhat outside of the support, which results in that it contributes to the activating function, but in an insignificant degree, as the element is of low weight relative to the body of inertia. The support for the body of inertia is designed in such a way that by itself it can strive to occupy a normal position, which results in only part of the total return forces arising from said transmission element.

As is evident from the foregoing, the return forces and the activating forces by means of the device according to the invention can be adapted quite independently of each other. With this arrangement the device can be designed for exactly the desired function as regards the activating sensitivity, the activating force, speed, and other factors. In this respect the device according to the invention differs advantageously from activating devices of the prior art, in connection with which there has been an insoluble connection between the return forces and the activating forces.

From what has been said above it should be evident that when the body of inertia and thereby the first transmission element 13 have again occupied their normal positions, the pawl will no longer be influenced but is pivoted downwards to its releasing position, so that the ratchet wheel 9 again can move freely in both directions of rotation.

The invention is not limited to the embodiments described above and illustrated in the drawings but can be varied within the scope of the following claims. By way of example it is in principle imaginable with a pawl mechanism of a more conventional type, and the first transmission element 13 as well as the body of inertia can be designed in several manners. By way of example the transmission element must not enclose the periphery of the pendulum but can be designed with a number of sensing elements, which are in between them connected. The supports can likewise comprise shafts, ball joints or other elements.

I claim:

1. Locking device for safety belts preferably intended for vehicles comprising a frame, a bandreel in the frame, a band on the reel to be wound up thereon, spring means for rotating the bandreel to wind up the band, ratchet wheel means in driving connection with the reel, a pawl mechanism for cooperation with the ratchet wheel means, said pawl mechanism when activated locking the ratchet wheel means to prevent the bandreel from rotating in an unwinding direction for the band, a body of inertia movable under the influence of forces of inertia from a resting position to an activated position, and transmission means including a first portion adjacent to the body of inertia having an annular form enclosing said body of inertia and displaceable by said body of inertia when the latter is moved to its activated position and a second portion adjacent to the pawl mechanism, said second portion being displaced by the displacement of the first portion for activating said pawl mechanism, a base connected to said frame having a first support, said body of inertia being carried by said first support for movement between said resting and activated positions thereof, and a second support on said base, said transmission means being carried by said second support, said transmission means resting on said second support with a resting surface thereof when said body of inertia is in its resting position and being moved to a leaning position wherein it rests on an edge of its resting surface when said body of inertia is in its activated position, thus raising said second portion of said transmission means a sufficient distance to activate the pawl mechanism.

2. Locking device according to claim 1, wherein there is provided a housing having a bottom forming said first support and an edge portion forming said second support, said transmission means having a flange portion supported by said edge portion of the housing.

3. Locking device according to claim 2, wherein said first portion of the transmission means hangs down from said edge portion of the housing along an inside wall of the housing at a distance therefrom in its inactivated position and abuts against said inside wall in its activated position.

4. Locking device according to claim 1, wherein the body of inertia has the form of a ball, and said first support has the form of a bowl, said body of inertia resting in the deepest portion of said bowl in its resting position.

5. Locking device for safety belts preferably intended for vehicles, comprising a frame, a bandreel in the frame, a band on the reel to be wound up thereon, spring means for rotating the bandreel to wind up the band, ratchet wheel means in driving connection with the reel, a pawl mechanism for cooperation with the ratchet wheel means, said pawl mechanism when activated locking the ratchet wheel means to prevent the bandreel from rotating in an unwinding direction for the band, a body of inertia movable under the influence of forces of inertia from a resting position to an activated position, and transmission means including a first portion adjacent to the body of inertia and displaceable by said body of inertia when the latter is moved to its activated position and a second portion adjacent to the pawl mechanism; said second portion being displaced by the displacement of the first portion for activating said pawl mechanism, a base connected to said frame having a first support, said body of inertia being carried by said first support for movement between said resting and activated positions thereof, and a second support on said base, said transmission means being carried by said second support, said transmission means resting on said second support with a resting surface thereof when said body of inertia is in its resting position and being moved to a leaning position wherein it rests on an edge of its resting surface when said body of inertia is in its activated position, thus raising said second portion of said transmission means a sufficient distance to activate the pawl mechanism, said pawl mechanism comprising at least one pawl cooperable with the ratchet wheel means, moving means for the pawl including a portion having a contact surface displaceable by said second portion of said transmission means in the raised position thereof, and a yielding connection means between said portion and the pawl allowing the pawl and the transmission means independent movements against the bias of the yielding means.

6. Locking device according to claim 5, wherein said yielding means comprises a springing portion of the pawl.

7. Locking device according to claim 5, wherein said yielding means comprises a spring resiliently embracing the pawl, one end of said spring being bendable away from the pawl in the direction towards the ratchet wheel means by means of the transmission means.

* * * * *